(12) United States Patent
Murakami (10) Patent No.: US 8,773,692 B2
(45) Date of Patent: Jul. 8, 2014

(54) PRINTING CONTROL APPARATUS AND PRINTING CONTROL METHOD FOR DOCUMENT LAYOUT PROCESSING

(75) Inventor: Yoshiyuki Murakami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 13/044,592

(22) Filed: Mar. 10, 2011

(65) Prior Publication Data
US 2011/0222122 A1  Sep. 15, 2011

(30) Foreign Application Priority Data
Mar. 10, 2010  (JP) .................................. 2010-052823

(51) Int. Cl.
G06F 3/12  (2006.01)
(52) U.S. Cl.
USPC .......................................... 358/1.15; 358/1.1
(58) Field of Classification Search
USPC ................................................ 358/1.15, 1.1
See application file for complete search history.

(56) References Cited

U.S. PATENT DOCUMENTS

| | | | | |
|---|---|---|---|---|
| 6,041,205 A | * | 3/2000 | Funada et al. | 399/196 |
| 2002/0035557 A1 | * | 3/2002 | Nagahara | 707/1 |
| 2003/0161003 A1 | * | 8/2003 | Herbert | 358/1.18 |
| 2004/0184109 A1 | * | 9/2004 | Short et al. | 358/400 |
| 2007/0109580 A1 | * | 5/2007 | Yoshida | 358/1.13 |
| 2008/0089593 A1 | * | 4/2008 | Ohwa | 382/225 |
| 2009/0119596 A1 | * | 5/2009 | Iwahara et al. | 715/730 |

FOREIGN PATENT DOCUMENTS

| | | |
|---|---|---|
| JP | 2004-005241 A | 1/2004 |
| JP | 2005-246683 A | 9/2005 |
| JP | 2006-222941 A | 8/2006 |
| JP | 2007-276139 A | 10/2007 |
| JP | 2008-257563 A | 10/2008 |

* cited by examiner

Primary Examiner — Benny Q Tieu
Assistant Examiner — Martin Mushambo
(74) Attorney, Agent, or Firm — Nutter McClennen & Fish LLP; John J. Penny, Jr.; Michael P. Visconti, III (57) ABSTRACT

A printing control apparatus includes: an accepting unit that accepts a setting regarding layout printing for laying out multiple document pages in order on a sheet-by-sheet basis; a selection unit that, in the case where the layout printing setting has been accepted by the accepting unit, displays graphic images of the multiple document pages and allows a specific page for which layout printing is not to be carried out to be selected from among the graphic images; a layout processing unit that does not perform the layout for the specific page selected through the selection unit and does perform the layout for the document pages aside from the specific page; and a print data generation unit that generates print data of the multiple document pages based on a result of the processing performed by the layout processing unit.

5 Claims, 8 Drawing Sheets

PROCESSING IN CASE WHERE A3 OR L SIZE DOCUMENTS ARE INTERMIXED WITH A4 DOCUMENTS AND OUTPUT PAPER IS SET TO A4

| | LAYOUT EXCLUSION | ENLARGE/ SHRINK | A3 PAGE | L PAGE |
|---|---|---|---|---|
| 1 | YES | YES | SHRINK TO A4 SIZE AND PRINT | ENLARGE TO A4 SIZE AND PRINT |
| 2 | YES | NO | PRINT DATA AT ORIGINAL DIMENSIONS IN A4 REGION AREA (MAY PROTRUDE OUTSIDE OF PAPER) | PRINT AT ORIGINAL DIMENSIONS |
| 3 | NO | YES | SHRINK TO A4 SIZE AND PRINT IN LAYOUT | ENLARGE TO A4 SIZE AND PRINT IN LAYOUT |
| 4 | NO | NO | PRINT DATA IN LAYOUT AT ORIGINAL DIMENSIONS IN A4 REGION AREA (MAY PROTRUDE OUTSIDE OF PAPER) | PRINT IN LAYOUT AT ORIGINAL DIMENSIONS |

FIG. 8

PRINTING CONTROL APPARATUS AND PRINTING CONTROL METHOD FOR DOCUMENT LAYOUT PROCESSING

INCORPORATED BY REFERENCE

The entire disclosure of Japanese Patent Application No. 2010-052823, filed Mar. 10, 2010 is expressly incorporated by reference herein.

BACKGROUND

1. Technical Field

The present invention relates to printing control apparatuses and printing control methods.

2. Related Art

Some image forming apparatuses, such as printers, copy machines, and so on, have layout printing functions for laying out multiple pages on a single sheet and printing those pages. In such layout printing, for example, A4-size originals are shrunk and multiple pages (for example, two pages, four pages, or the like) are printed onto a single A4 sheet. Such layout printing conserves paper, and is being widely used in today's climate of increased awareness of environmental issues.

JP-A-2008-257563, for example, discloses a printer driver that, when carrying out layout printing of document data in which different paper sizes are intermixed, carries out the layout according to the paper size and executes printing.

However, because the layout printing settings are carried out according to the paper size, the printing is executed using an uniform layout that has been set for all of the data, even in the case where text, graphics, and the like are intermixed throughout pages of the same paper size. Accordingly, pages that include small graphics, pictures, or the like are also laid out and printed, and because the graphics, pictures, or the like are shrunk, it is difficult to see the details in those graphics, pictures, or the like.

SUMMARY

An advantage of some aspects of the invention is to make it easy to set layout printing on a page-by-page basis. Having been conceived in order to solve at least some of the aforementioned problems, the invention can be implemented as the following aspects or application examples.

First Application Example

A printing control apparatus according to a first application example of the invention includes: an accepting unit that accepts a setting regarding layout printing for laying out multiple document pages in order on a sheet-by-sheet basis; a selection unit that, in the case where the layout printing setting has been accepted by the accepting unit, displays graphic images of the multiple document pages and allows a specific page for which layout printing is not to be carried out to be selected from among the graphic images; a layout processing unit that does not perform the layout for the specific page selected through the selection unit and does perform the layout for the document pages aside from the specific page; and a print data generation unit that generates print data of the multiple document pages based on a result of the processing performed by the layout processing unit.

According to this configuration, in the case where print data for layout printing is generated, the printing control apparatus displays the graphic images of the multiple document pages, allows the selection of a specific page to which the layout printing is not to be applied from among the displayed graphic images, and carries out settings so that the layout is not carried out on the selected specific page but is carried out on the document pages aside from the specific page. Accordingly, because the specific page to which the layout printing is not to be applied can be selected while visually confirming the graphic images of the multiple document pages, it is easy to carry out layout printing settings on a page-by-page basis.

Second Application Example

In the printing control apparatus according to the stated first application example, in the case where the multiple document pages include a page of a size that differs from the size of the sheet, the selection unit further allows a selection of whether or not to fit the size of the page to the size of the sheet, and the apparatus further includes a scaling processing unit that fits the size of the page to the size of the sheet by enlarging or shrinking the page based on a result selected through the selection unit.

According to this configuration, in the case where a page of a different size than the size of the sheet is included in the multiple document pages, the size of the page can be fit to the size of the sheet as necessary by enlarging or shrinking the page.

Third Application Example

In the printing control apparatus according to the above stated application examples, it is preferable that the selection unit classifies the graphic images into groups based on attributes of the graphic images and allows the selection of a group created through the classification.

Fourth Application Example

A printing control method according to a fourth application example of the invention includes: accepting a setting regarding layout printing for laying out multiple document pages in order on a sheet-by-sheet basis; allowing, in the case where the layout printing setting has been accepted in the accepting, a specific page for which layout printing is not to be carried out to be selected from among the graphic images by displaying graphic images of the multiple documents pages; performing the layout for the document pages aside from the specific page, not performing the layout for the specific page selected in the selecting; and generating print data of the multiple document pages based on a result of the processing performed in the layout performing.

According to this method, in the case where print data for layout printing is generated, the graphic images of the multiple document pages are displayed respectively, the selection of a specific page to which the layout printing is not to be applied is allowed from among the displayed graphic images, and settings are carried out so that the layout is not carried out on the selected specific page but is carried out on the document pages aside from the specific page. Accordingly, because the specific page to which the layout printing is not to be applied can be selected while visually confirming the graphic images of the multiple document pages, it is easy to carry out layout printing settings on a page-by-page basis.

Fifth Application Example

A printing control apparatus according to a fifth application example of the invention includes: an accepting unit that accepts a setting regarding layout printing for laying out multiple document pages in order on a sheet-by-sheet basis; a layout processing unit that, in the case where the layout printing setting has been accepted by the accepting unit, determines whether or not to perform the layout on the document pages based on attribute information of the document pages, and performs the layout on the document pages based on a result of the determination; and a print data generation unit that generates print data of the multiple document pages based on a result of the processing performed by the layout processing unit.

According to this configuration, in the case where print data for layout printing is generated, the printing control apparatus determines whether or not to carry out the layout on the document pages based on attribute information of the document pages, and carries out the layout on the document pages based on the result of the determination. Accordingly, the layout printing settings for the document pages can be carried out easily on a page-by-page basis.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
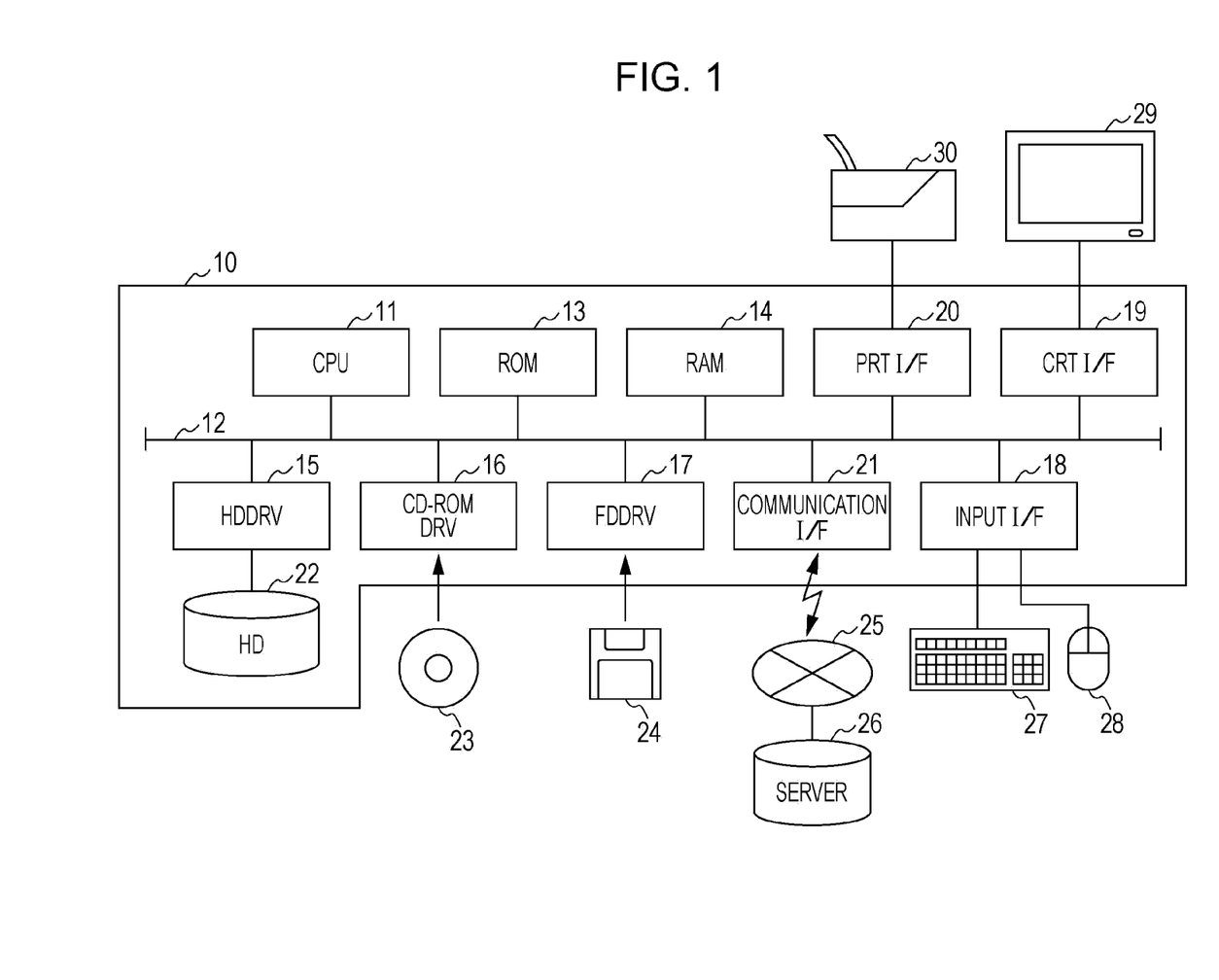
FIG. 1 is a diagram illustrating the overall configuration of a computer in which a printer driver according to an embodiment of the invention has been installed.

Hereinafter, a printing control apparatus that controls a printer will be described with reference to the drawings.
Embodiment FIG. 1 is a diagram illustrating the overall configuration of a computer 10, in which a printer driver 50 has been installed, functioning as a printing control apparatus. As shown in FIG. 1, the computer 10 includes a CPU (Central Processing Unit) 11 that functions as the center of computational processes, and the CPU 11 is capable of accessing a ROM (Read-Only Memory) 13, a RAM (Random Access Memory) 14, and the like via a system bus 12. A hard disk drive 15, a CD-ROM drive 16, and a Floppy® disk drive 17, serving as external storage units, are connected to the system bus 12; an operating system, an application program capable of creating document information, image information, and so on (not shown) and the like are stored as software in a hard disk 22 that is connected to the hard disk drive 15 and that stores data. The software is transferred to the RAM 14 as appropriate by the CPU 11 when the software is to be executed. The CPU 11 accesses the RAM 14 as appropriate and executes the software. In other words, various programs are executed using the RAM 14 as a temporary work area.

An input interface 18 is connected to the stated system bus 12, and a keyboard 27, a mouse 28, or the like are connected to the input interface 18 as operation input devices. In addition, a CRT interface 19 is connected to the system bus 12, and a display 29 is connected via this CRT interface 19. Furthermore, a printer interface 20 is connected to the system bus 12, and a printer 30 that prints predetermined print jobs is connected via this printer interface 20. In this embodiment, the configuration of the computer 10 is described in a simplified manner, but it goes without saying that a typically-configured personal computer can be employed as the computer 10.

However, the computer 10 applied in this embodiment is not intended to be limited to a personal computer. The computer 10 is also not limited to a desktop computer, and may instead be a laptop computer or another type of mobile computer. Furthermore, the connection interface between the computer 10 and the printer 30 need not be limited to a parallel connection, and various types of connections, such as a serial interface, SCSI (Small Computer System Interface), USB (Universal Serial Bus), or the like, can be used.

In addition, although the various types of software mentioned above are stored in the hard disk 22, the recording medium capable of storing the various pieces of software is not limited to the hard disk 22. For example, the recording medium may be a CD-ROM 23, a Floppy® disk 24, or the like. The software recorded on these recording media are thus loaded into the computer 10 via the CD-ROM drive 16, the Floppy® disk drive 17, or the like, and are then installed in the hard disk 22. The software is loaded into the RAM 14 from the hard disk 22 by the CPU 11 as mentioned above, and the various processes are then executed. The recording medium is not limited to the aforementioned examples, however, and a magneto-optical disk or the like may be used as well. Furthermore, a non-volatile memory such as a flash memory serving as a semiconductor device may also be employed. Alternatively, a predetermined communication line 25 can be connected to through a communication interface 21 such as a modem connected to the system bus 12, and the various types of software can then be downloaded by accessing a file server 26 located on the communication line 25 that is capable of storing such program types.

The printer 30 includes a CPU, firmware, and the like (not shown), and, in accordance with a program denoted in the firmware, receives print job data configured of CMYK data, page description language, or the like sent by the computer 10 through the printer interface 20. Then, the printer 30 executes printing while driving a print head, a print paper transport mechanism, and so on using a predetermined driving device, based on the print job data.

Figure 2:
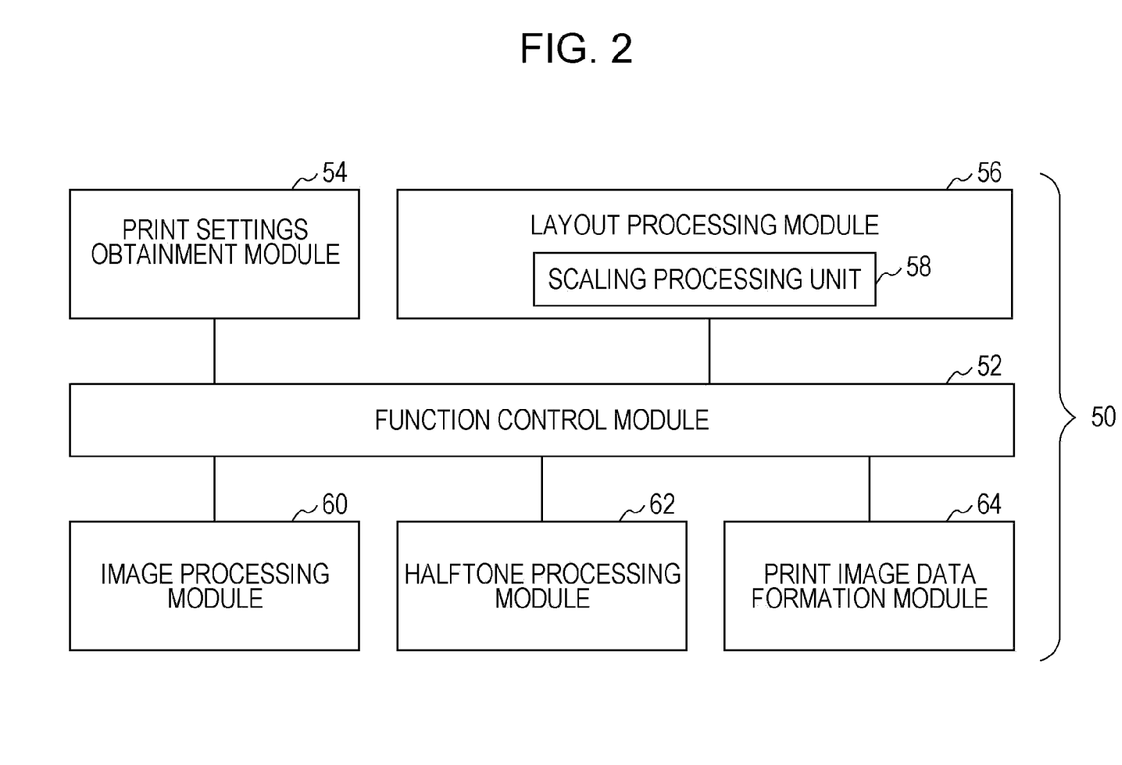
FIG. 2 is a diagram illustrating the module configuration of a printer driver according to an embodiment of the invention.

Next, FIG. 2 is a diagram illustrating the configuration of modules in the printer driver 50. The printer driver 50 includes a print settings obtainment module 54, a layout processing module 56, an image processing module 60, a halftone processing module 62, a print image data formation module 64, and a function control module 52 that controls the various functional units; the modules 54 to 64 generate print job data by operating together while realizing predetermined functions based on the control of the function control module 52.

The print settings obtainment module 54 obtains various types of print settings. In this embodiment, print settings set through a UI (User Interface) window of the printer driver 50 are stored in a storage region called "Devmode". The print settings obtainment module 54 obtains print setting information from the Devmode storage region.

The layout processing module 56 is a layout processing unit, and arranges, upon a single sheet, the bitmaps of multiple pages expanded based on the print settings when the print image data formation module 64 forms print image data. This layout processing module 56 includes a scaling processing unit 58 (a scaling processing unit) that carries out a process for enlarging or shrinking the bitmaps.

Here, in, for example, the case in which two pages of an A4 original (in portrait orientation) are laid out on A4 paper (in landscape orientation) (2-up), the scaling processing unit 58 shrinks to develop the bitmaps of the originals to an A5 portrait region by communicating a resolution that is lower than the resolution of the originals to a GDI (Graphical Device Interface). The layout processing module 56 then arranges the bitmap of the first page in a printing start position on the A4 paper (in landscape orientation) and cancels a page break control command. Next, the layout processing module 56 arranges the bitmap of the next page in a position located one A5 page's worth of space from the printing start position on the A4 paper (in landscape orientation), and adds the page break control command; through this, the layout process can be executed.

Meanwhile, for specified pages, the layout processing module 56 allocates a single original to a single page without carrying out the layout process (1-up). In this embodiment, pages for which the layout process is not to be carried out (excluded pages) are specified through a UI window, mentioned later. In this case, the scaling processing unit 58 can carry out only enlargement or shrinking processes for the pages to be excluded from the layout process by communicating a resolution that differs from the resolution of the original to the GDI. These settings are defined in an extension region of the Devmode storage region.

The image processing module 60 carries out image processes such as color correction processes or the like. Meanwhile, the halftone processing module 62 carries out a halftone process on the print data on which the image process such as the color correction process or the like has been carried out. The print image data formation module 64 is a print data generation unit, and creates print job data by forming the print image data created by the layout processing module 56, the image processing module 60, and the halftone processing module 62 on a page-by-page basis. The created print job data is sent to the printer 30 via a spooler, where printing is executed based on the print job data.

Here, in this embodiment, when a user prints a document or the like by selecting printing in an application program, predetermined print settings are carried out in the printer driver 50 that is launched when printing is selected. At this time, the user calls a printing conditions setting window 100, shown in FIG. 3, in order to select printing functions in the application program.

Figure 3:
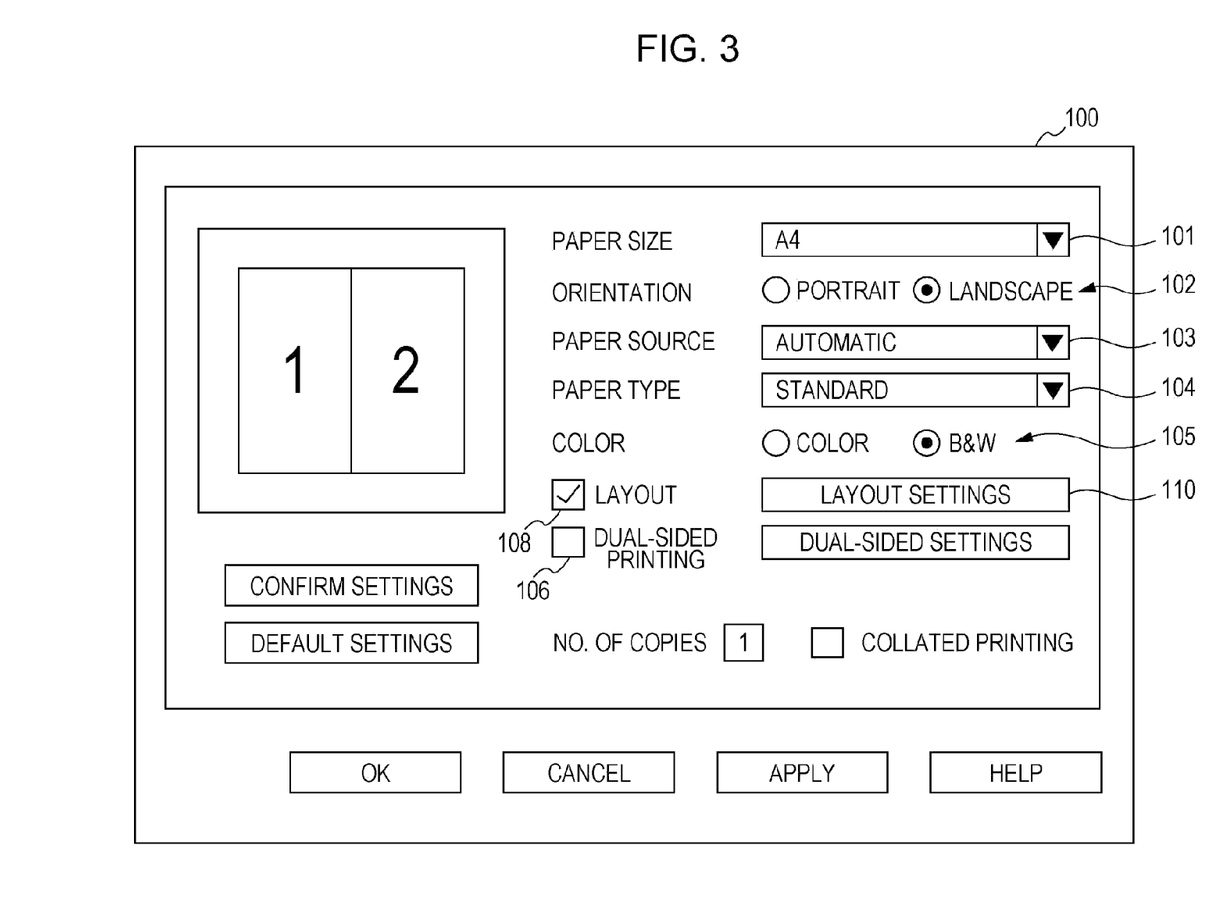
FIG. 3 is a diagram illustrating a printing conditions setting window.

The printing conditions setting window 100 accepts the input of print settings specified by the user. The printing conditions setting window 100 includes regions for accepting specifications of items, such as paper size 101, orientation 102, paper source 103, paper type 104, color 105, dual-sided printing 106, layout 108, and so on. The user can set his or her desired conditions in the respective regions.

Figure 4:
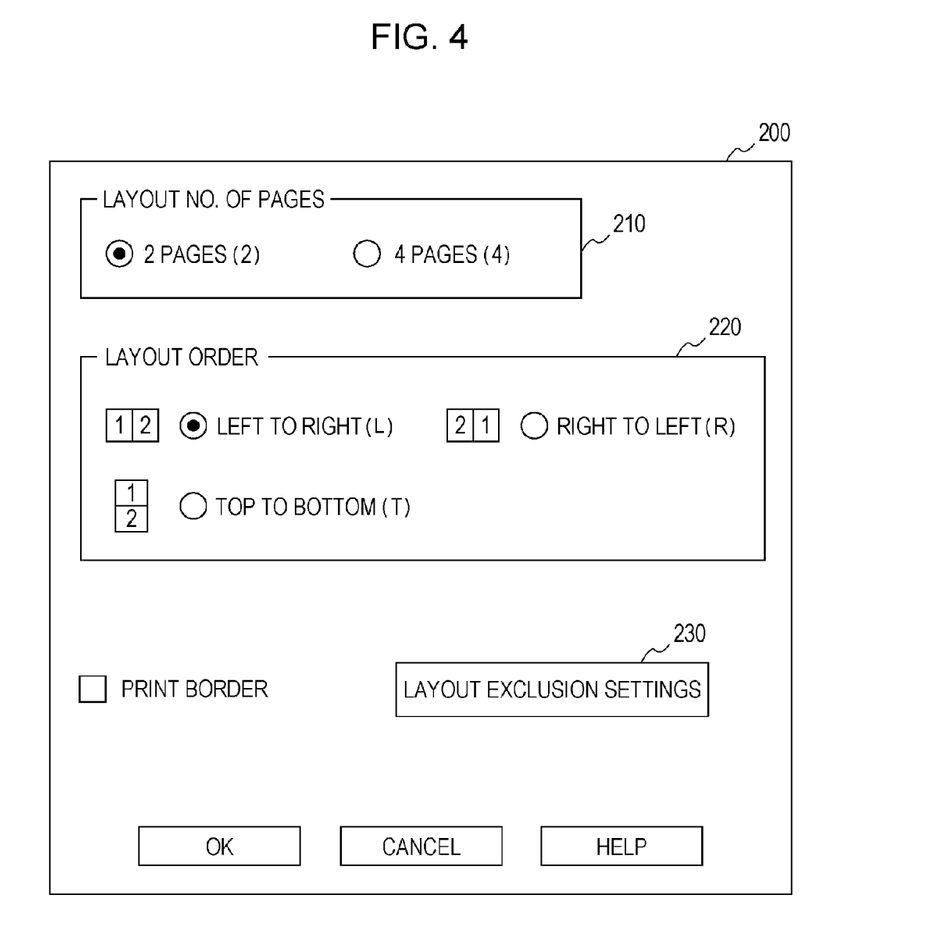
FIG. 4 is a diagram illustrating a layout printing settings input window.

The printing conditions setting window 100 also includes a layout settings button 110. The layout settings button 110 can be pressed in the case where layout 108 is checked. When the layout settings button 110 is pressed, a layout settings input window 200, shown in FIG. 4, is displayed.

The layout settings input window 200 is an accepting unit for accepting the input of layout settings specified by the user for layout printing. The layout settings input window 200 includes a layout number of pages setting region 210, a layout order setting region 220, and a layout exclusions setting button 230 for setting pages to be excluded from layout.

The layout number of pages setting region 210 accepts settings for the number of pages to allocate to a single page. In the example shown in FIG. 4, two pages or four pages can be selected. Meanwhile, the layout order setting region 220 accepts the selection of an order by which to allocate multiple pages to a sheet.

Figure 5:
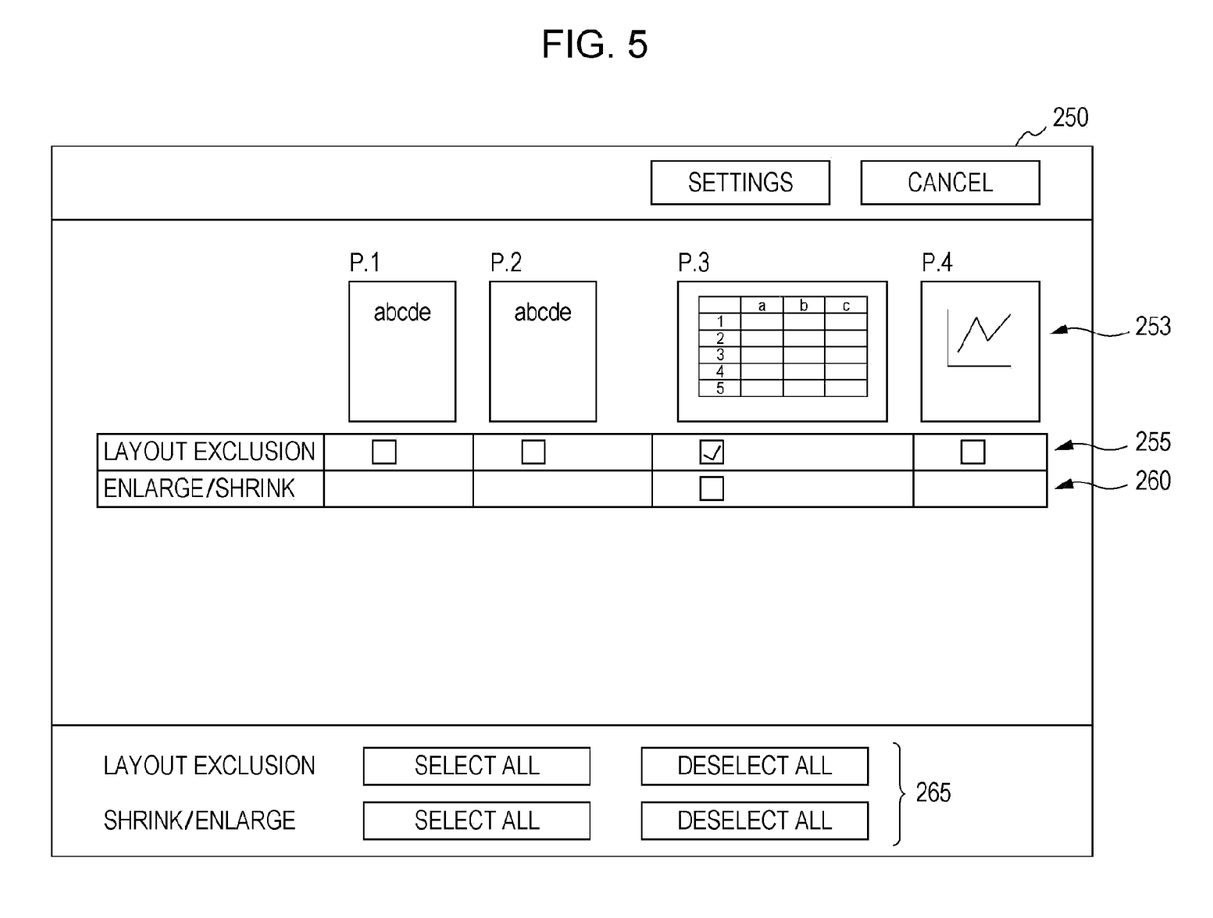
FIG. 5 is a diagram illustrating a layout exclusions setting window.
Figure 6:
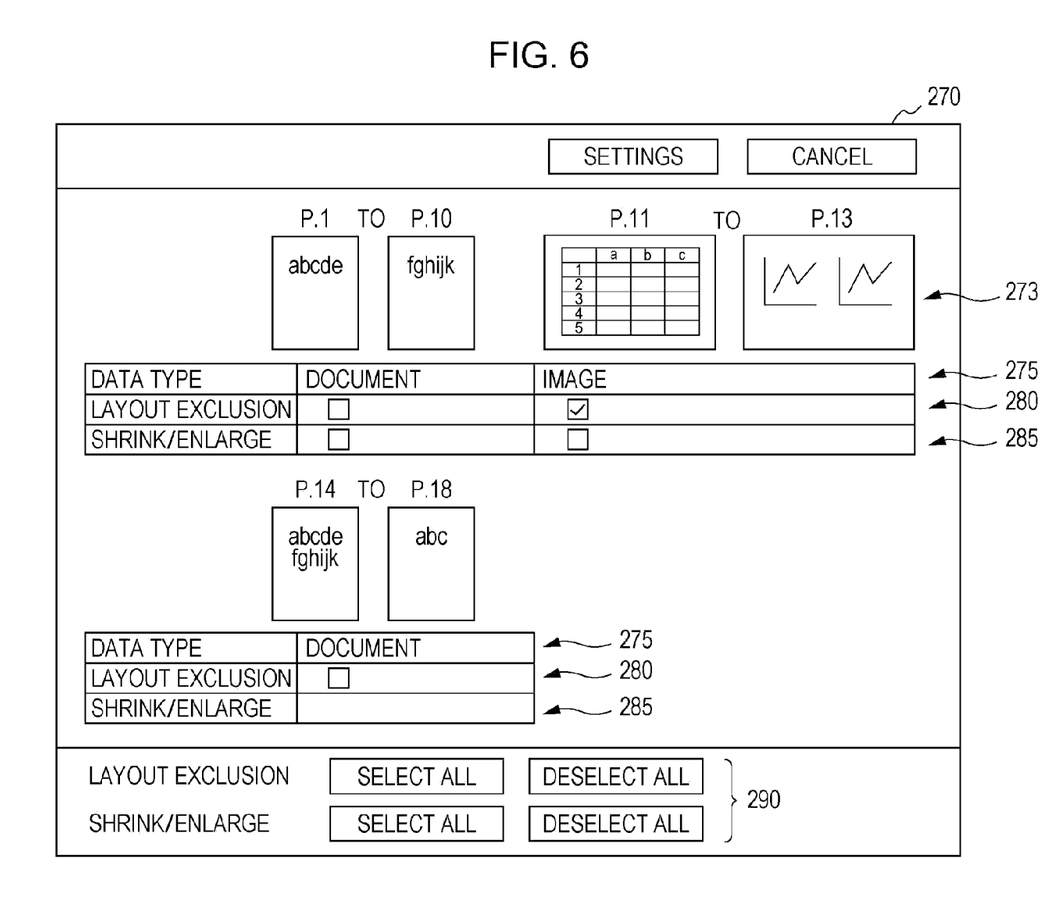
FIG. 6 is a diagram illustrating a layout exclusions setting window.

When the layout exclusions setting button 230 is pressed, a selection unit, or in other words, a first layout exclusions setting window 250, shown in FIG. 5, or a second layout exclusions setting window 270, shown in FIG. 6, is displayed. Which of the windows to display may be set by the user in advance. Alternatively, the printer driver 50 may analyze the document information to be printed and determine which window to display based on, for example, whether document data and image data are intermixed. Furthermore, in the case where automatic processing has been set in advance and the layout exclusions setting button 230 has been pressed, predetermined layouts may be excluded according to the automatic processing settings, instead of displaying the setting windows. In this case, the layout exclusions may be determined based on the attribute information, the data type, and so on for the respective pages. In other words, the layout exclusions may be determined automatically in the case where graphics, photographs, and so on have been allocated to the page.

The first layout exclusions setting window 250 displays graphic images 253 of the respective pages in page order, and displays layout exclusion checkboxes 255 in a selectable manner for each of the graphic images 253. Meanwhile, in the case where a document size that is different from the output paper size set by the printer driver 50 is included, a setting checkbox 260 is displayed for the graphic image 253 of that page so as to be selectable, regardless of layout exclusion settings.

In addition, in the lower portion of the first layout exclusions setting window 250, all-set buttons 265 are displayed in a selectable manner so that the graphic images 253 for all pages can be set at once.

The second layout exclusions setting window 270 displays graphic images 273 for the respective pages in page order, and furthermore displays the graphic images 273 in groups based on data type information 275 indicating attributes of the respective graphic images 273; further still, layout exclusion checkboxes 280 are displayed so that selections can be carried out by groups. In this embodiment, in the case where a page of a document size that differs from the output paper size set by the printer driver 50 is included in a group, a set checkbox 285 is displayed in a selectable manner for that group regardless of the settings for layout exclusion. Note that the data type of the graphic images 273, information indicating whether or not objects are included, and so on are determined based on information exchanged between the GDI and the printer driver 50 (that is, font image information, pass rendering information, image rendering information, and so on). In this embodiment, the data type is either "document" or "image", but the data type is not limited to these two. Furthermore, in the case where "document" data and "image" data are intermixed in the same page, the page is placed into an "image" group.

In addition, in the lower portion of the second layout exclusions setting window 270, all-set buttons 290 are displayed in a selectable manner so that the graphic images 273 for all pages can be set at once.

Figure 7:
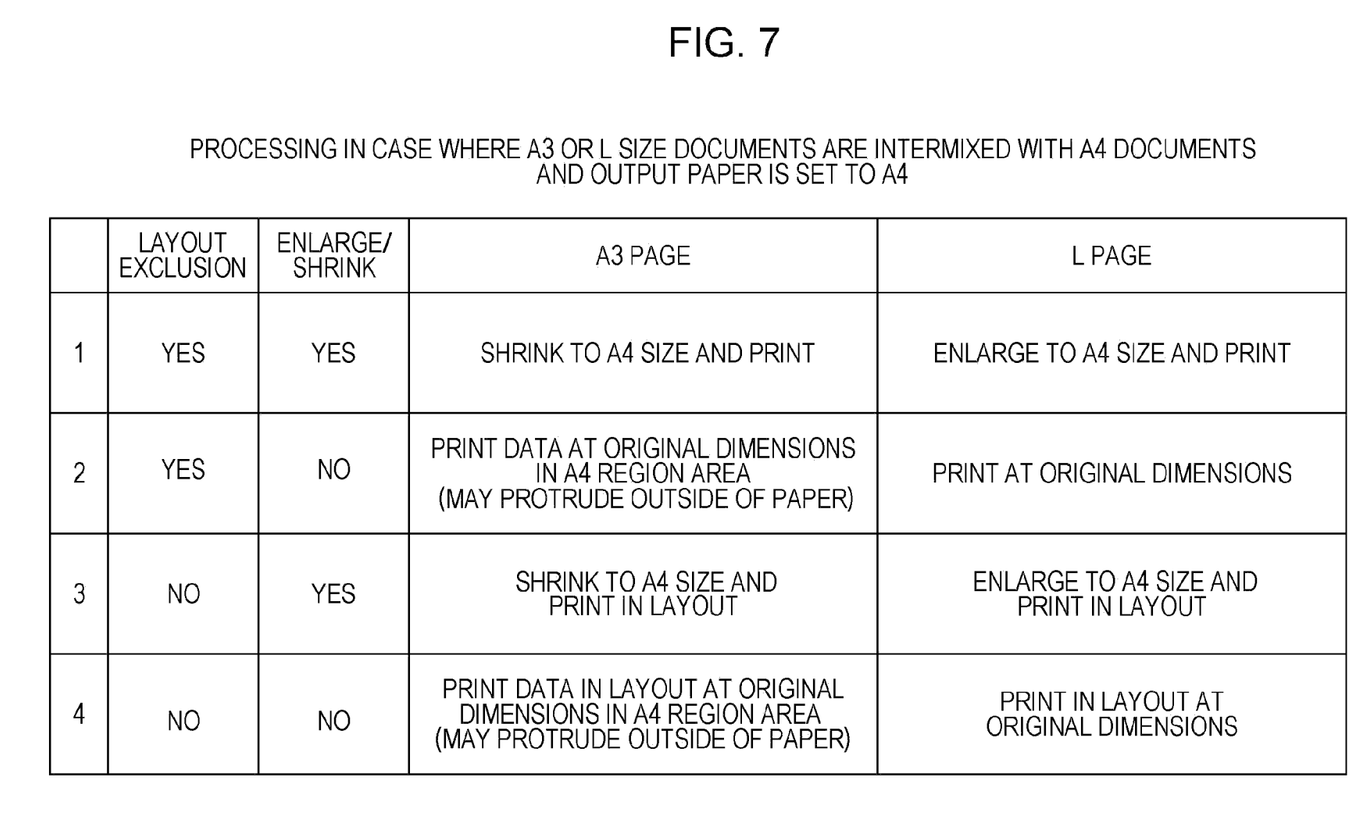
FIG. 7 is a diagram illustrating a result of printing excluded from layout.

The information set in the first layout exclusions setting window 250 shown in FIG. 5 or the second layout exclusions setting window 270 illustrated in FIG. 6 are written into a predetermined location in the Devmode storage region. FIG. 7 illustrates examples of printing results in this embodiment in the case where A3 or L-sized originals are intermixed in an A4 document and the output paper is set to A4.

Figure 8:
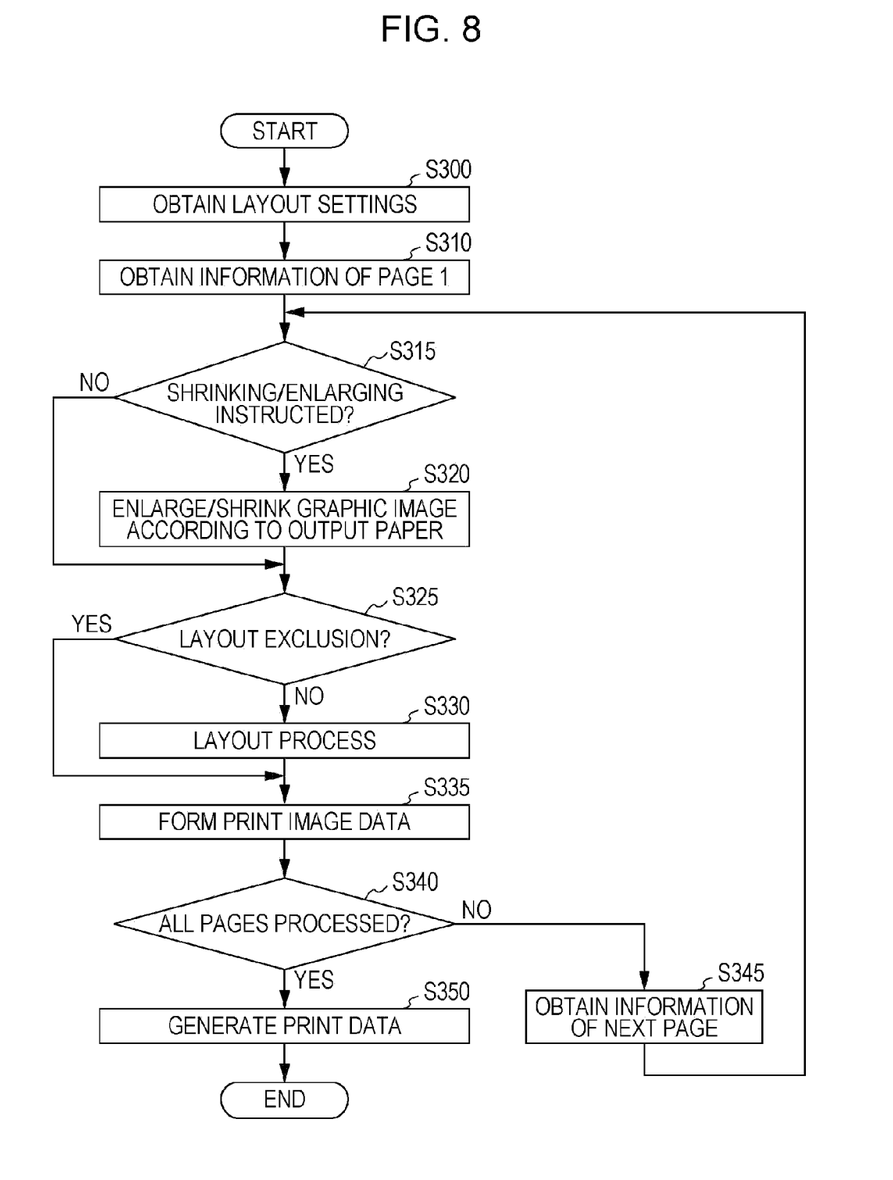
FIG. 8 is a flowchart illustrating the flow of processes performed by a layout processing module.

FIG. 8 is a flowchart illustrating the flow of processes performed by the layout processing module 56. This process is called in the case where the printer driver 50 is to carry out a layout process. When this process is started, first, the CPU 11 of the computer 10 obtains the layout settings written into the Devmode storage region (step S300). Then, the CPU 11 obtains information of a predetermined first page (step S310). Next, the CPU 11 determines whether or not a shrinking or enlargement process has been instructed for that page (step S315).

In the case where it has been determined that a shrinking or enlargement process has been instructed for that page (Yes in step S315), the CPU 11 carries out the enlargement or shrinking process on that page in accordance with the output paper that is set (step S320), and the process advances to step S325. On the other hand, in the case where it has been determined that a shrinking or enlargement process has not been instructed for that page (No in step S315), the process advances to step S325.

In step S325, the CPU 11 determines whether or not that page has been excluded from layout. Here, in the case where it has been determined that that page has not been excluded from layout (No in step S325), the CPU 11 carries out a layout process (step S330), and the process advances to step S335. On the other hand, in the case where it has been determined that that page has been excluded from layout (Yes in step S325), the process advances to step S335.

In step S335, the CPU 11 forms the print image data for the first page. Then, the CPU 11 determines whether or not all of the pages have been processed (step S340).

Here, in the case where it has been determined that all of the pages have not yet been processed (No in step S340), the CPU 11 obtains the information of the next page (step S345), returns to the step of determining whether or not a shrinking or enlargement process has been instructed (step S315), and processes the pages thereafter in order. On the other hand, in the case where it has been determined that all the pages have been processed (Yes in step S340), the CPU 11 generates the print data (step S350) and ends the series of processes.

According to the embodiment described thus far, pages that are to be excluded from layout can be set through a UI window such as the first layout exclusions setting window 250 or the second layout exclusions setting window 270, and thus it is possible to specify, visually and easily, which pages are to be excluded from layout. Furthermore, even in the case where a page of a document size that differs from the output paper size set by the printer driver 50 is included, such a page can be visually identified and laid out in accordance with the output paper size.

Although an embodiment of the invention has been described with reference to the drawings, the specific configuration thereof is not intended to be limited to this embodiment, and various alterations, variations, and the like are possible without departing from the essential spirit of the invention. Furthermore, the apparatuses that execute the aforementioned methods may be realized by single, independent apparatuses, or may be realized by a combination of multiple apparatuses; all such forms are considered to fall within the scope of the invention.

What is claimed is:

1. A printing control apparatus comprising:
an accepting unit that accepts a setting regarding layout printing for laying out multiple document pages;
a selection unit that, in the case where the layout printing setting has been accepted by the accepting unit, displays graphic images representing the multiple document pages with a layout exclusions setting member through which a document page for which layout printing is not to be applied is specified as a specified document page;
a layout processing unit that does not perform layout processing for the specified document page and does perform layout processing for the document pages which are not specified, said layout processing of the document pages which are not specified on a single sheet; and
a print data generation unit that generates print data of the multiple document pages based on a result of the processing performed by the layout processing unit, said print data comprising print data of the specified document page and print data of the document pages which are not specified.

2. The printing control apparatus according to claim 1, wherein in the case where the multiple document pages include a page of a size that differs from the size of a sheet, the selection unit further allows a selection of whether or not to fit the size of the page to the size of the sheet, and
the apparatus further comprising:
a scaling processing unit that fits the size of the page to the size of the sheet by enlarging or shrinking the page based on a result selected through the selection unit.

3. The printing control apparatus according to claim 1, wherein the selection unit classifies the graphic images into groups based on attributes of the graphic images and allows the selection of a group created through the classification.

4. A printing control method comprising:
accepting a setting regarding layout printing for laying out multiple document pages;
in the case where the layout printing setting has been accepted, displaying graphic images representing the multiple document pages with a layout exclusions setting member through which a document page for which layout printing is not to be applied is specified as a specified document page;
performing layout processing for the document pages aside from the specified document page and not performing layout processing for the specified document page, said layout comprising laying out a plurality of document pages aside from the specified document page on a single sheet; and
generating print data of the multiple document pages based on a result of the layout processing performed, said print data comprising print of the specified document page and print data of the document pages aside from the specified document page.

5. A printing control apparatus comprising:
an accepting unit that accepts a setting regarding layout printing for laying out multiple document pages;
a layout processing unit that, in the case where the layout printing setting has been accepted by the accepting unit, determines whether or not to perform layout processing on the document pages based on attribute information of the document pages, and performs layout processing on the document pages having certain attribute information and does not perform layout processing on document that do not have said certain attribute information; and a print data generation unit that generates print data of the multiple document pages based on a result of the processing performed by the layout processing unit, said print data comprising print data of document pages for which layout processing has been performed and print data of a document page for which layout processing has not been performed.

\* \* \* \* \*